United States Patent [19]

Panicali

[11] Patent Number: 4,935,858
[45] Date of Patent: Jun. 19, 1990

[54] AUXILIARY OUTPUT REGULATION TECHNIQUE FOR POWER SUPPLIES

[75] Inventor: Natalino Panicali, Schaumburg, Ill.

[73] Assignee: Motorola, Inc., Schaumburg, Ill.

[21] Appl. No.: 402,403

[22] Filed: Sep. 5, 1989

[51] Int. Cl.⁵ .......................................... H02M 3/335
[52] U.S. Cl. ......................................... 363/21; 363/78; 363/97; 323/267
[58] Field of Search ....................... 363/20, 21, 78, 79, 363/80, 95, 97, 131; 323/267

[56] References Cited

U.S. PATENT DOCUMENTS

| | | | |
|---|---|---|---|
| 3,671,853 | 6/1972 | Weischedel et al. | 323/267 |
| 4,419,723 | 12/1983 | Wilson, Jr. | 363/21 |
| 4,459,651 | 7/1984 | Fenter | 363/21 |
| 4,623,960 | 11/1986 | Eng | 363/97 |
| 4,660,136 | 4/1987 | Montorefano | 323/267 |
| 4,665,473 | 5/1987 | Onda et al. | 323/267 |
| 4,672,516 | 6/1987 | Ney et al. | 363/21 |
| 4,680,688 | 7/1987 | Inou et al. | 363/21 |
| 4,745,538 | 5/1988 | Cross et al. | 363/97 |
| 4,849,868 | 7/1989 | Fisher | 363/21 |

*Primary Examiner*—Peter S. Wong
*Attorney, Agent, or Firm*—Timothy W. Markison; Steven Parmelee; Joseph P. Krause

[57] ABSTRACT

A regulation technique for regulating at least one auxiliary output of a power supply having a regulated main output. When the auxiliary output reaches a first or a second predetermined value, the feedback circuit of the power supply is adjusted such that the auxiliary output is substantially maintained within the first and second predetermined values.

4 Claims, 2 Drawing Sheets

AUXILIARY OUTPUT REGULATION TECHNIQUE FOR POWER SUPPLIES

TECHNICAL FIELD

The present invention relates generally to power supplies and in particular to an auxiliary output regulation technique for such power supplies having a main output and at least one auxiliary output.

BACKGROUND OF THE INVENTION

A multi-output power supply typically has one transformer that provides for a main output and at least one auxiliary output. Generally, the main output is regulated by a feedback circuit that controls the volt-second product of the transformer such that the main output remains relatively constant. With this regulation method, the main output typically has a total regulation of less than 0.5%, where total regulation is the sum of the line, load, and cross regulation. While the main output is tightly regulated, the auxiliary output, without some independent regulation circuit, varies considerably. It is not uncommon for an unregulated auxiliary output to have a total regulation of 15%.

There are a variety of known regulation circuits that will tightly regulate the auxiliary output (less than 5% total regulation), such as linear regulators or DC-DC converters. Linear regulators, such as the 317 series manufactured by Motorola, Inc. and others, are relatively efficient and inexpensive for auxiliary oututs having light loads, typically less than 0.5 Amp. When the load requirements exceed 0.5 Amp, cost, efficiency, and heat dissipation of a linear regulator become a primary concern and may result in a relatively expensive, thermally, and electrically inefficient auxiliary regulation circuit. For load requirements greater than 5.0 Amps, a linear regulator is generally too inefficient and/to too expensive to use, thus a DC-DC converter, or the equivalent, is used. A DC-DC converter may be as much as 90% efficient and have a total regulation of less than 1%, however, a substantial amount of components is required to achieve this. A switch mode DC-DC converter typically requires a switching element, a transformer, a regulation or a feedback circuit, and a filter.

A need exists for an auxiliary output regulation technique that will maintain acceptable main output regulation, that will be more efficient and applicable to higher current levels than a linear regulator, and that will require less components and complexity than a DC-DC converter.

SUMMARY OF THE INVENTION

These needs and others are substantially met by the auxiliary output regulation technique for power supplies disclosed herein. For a power supply having a main output and at least one auxiliary output, wherein the main output is regulated by feedback, the invention comprises a method for regulating the auxiliary output comprising the steps of adjusting the feedback to prevent the auxiliary output from substantially falling below a first predetermined value whenever the auxiliary output reaches the first predetermined value, and adjusting the feedback to prevent the auxiliary output from substantially rising above a second predetermined value whenever the auxiliary output reaches the second predetermined value. The method further requires that the second predetermined value be graeter than the first predetermined value.

In one embodiment, the power supply is a switch mode power supply having a main output and at least one auxiliary output. The main output is tightly regulated by feedback which sensing the main output and adjusts the volt-second product of the transformer to maintain the main output at a predetermined value. The auxiliary output is maintained substantially within the first and second predetermined values by adjusting the feedback whenever the auxiliary output is not substantially within the first and second predetermined values.

BEST MODE FOR CARRYING OUT THE INVENTION

Figure 1:
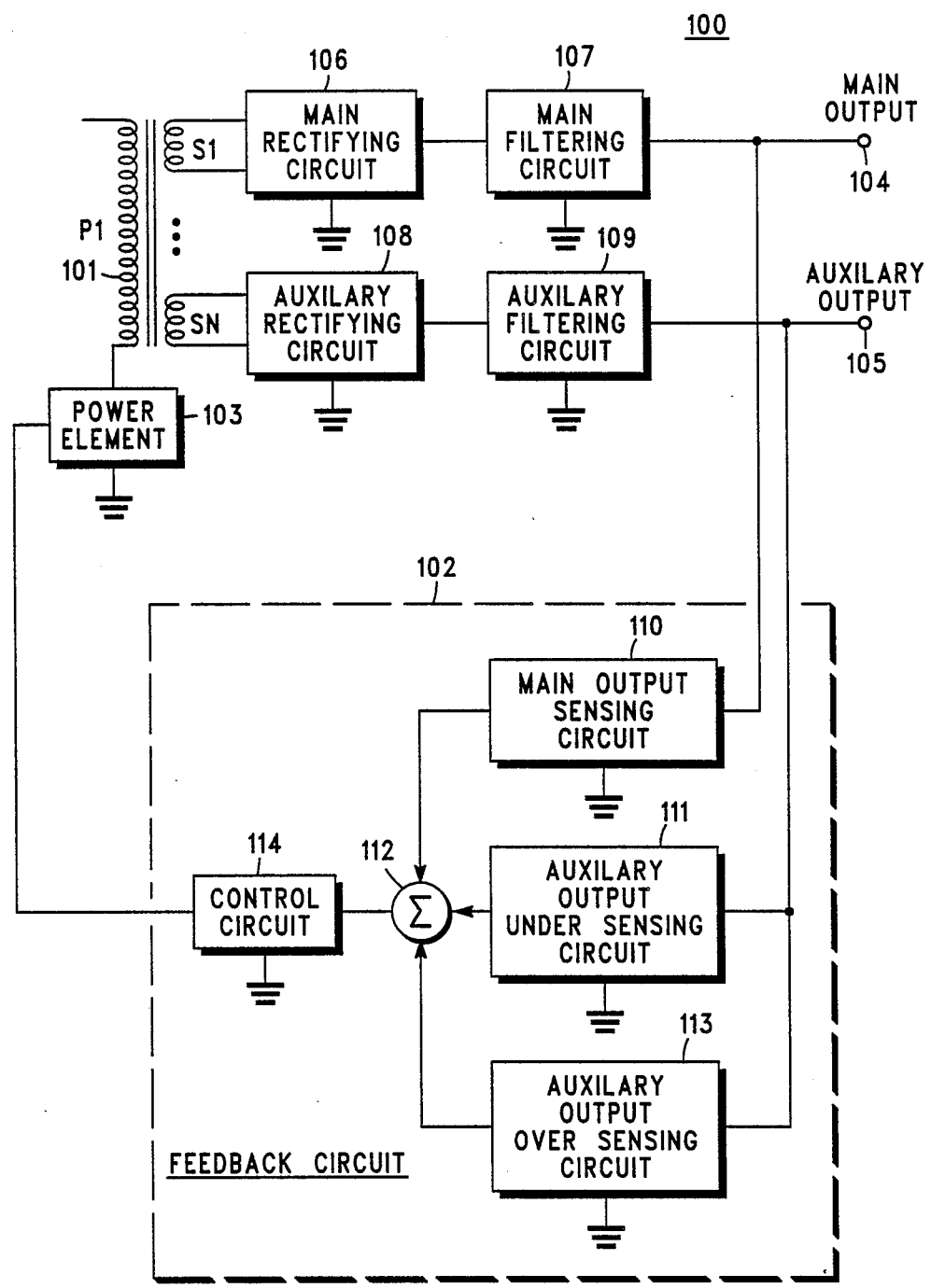
FIG. 1 illustrates a power supply that operates in accordance with the disclosed invention.

FIG. 1 illustrates a power supply (100) having a transformer T1 (101), a feedback circuit (102), a power element (103), a main rectifying circuit (106), a main filtering circuit (107), a main output (104), an auxiliary rectifying circuit (108), an auxiliary filtering circuit (109), and at least one auxiliary output (105). The transformer (101) comprises at least one primary winding (P1), and may have a plurality of secondaries (shown are S1-Sn). The feedback circuit (102) comprises a main output sensing circuit (110), an auxiliary output under sensing circuit (11), an auxiliary output over sensing circuit (113), a summing circuit (112), and a control circuit (114).

Generally, when the auxiliary output (105) is substantially between a first predetermined value and a second predetermined value, where the second predetermined value is greater than the first predetermined value, the auxiliary output sensing circuits (111 and 113) are in a high impedance state. With the auxiliary sensing circuits (111 and 113) in a high impedance state, the control circuit (114) receives only a main regulation signal which is generated by the main sensing circuit (110). Thus, the feedback circuit (102) substantially performs as if there is no auxiliary regulation circuitry at all.

The auxiliary output under sensing circuit (111) activates when the auxiliary output reaches the first predetermined value or when a first representation of the auxiliary volatge (105) reaches a first predetermined threshold. The first representation of the auxiliary output may be achieved by any circuit that represents the auxiliary output (105) such as a resistive divider. In some applications, the first representation of the auxiliary output may be the auxiliary output (105) itself.

Once active, the auxiliary output under sensing circuit (111) generates an auxiliary regulation signal which is combined, by the summing circuit (112), with the main regulation signal. The control circuit (114) receives the resulting regulation signal and adjusts the power element (103) such that the auxiliary output (105) remains substantially at the first predetermined value and the main output (104) remains substantially within its predetermined limits. When the auxiliaryy output rises above the first predetermined value, the auxiliary output under sensing circuit (111) returns to a high impedance state.

Similarly, the auxiliary output over sensing circuit (113) becomes active when it senses that the auxiliary output reaches the second predetermined value or when it senses that a second representation of the auxiliary output (105) reaches a second predetermined threshold. The second representation of the auxiliary output may be comprised of the same topology as the first representation of the auxiliary output, and in some applications, the first and the second representations of the auxiliary output may be the same circuit.

Once active, the auxiliary output over sensing circuit (113) provides an auxiliary regulation signal to the summing circuit (112) which combines the auxiliary regulation signal with the main regulation signal. The control circuit (114) uses the resulting regulation signal to control the power element (103) such that the auxiliary output (105) remains substantially at the second predetermined value and the main output (104) remains substantially within its predetermined limits. When the auxiliary output (105) falls below the second predetermined value, the auxiliary output over sensing circuit (113) returns to a high impedance state.

Figure 2:
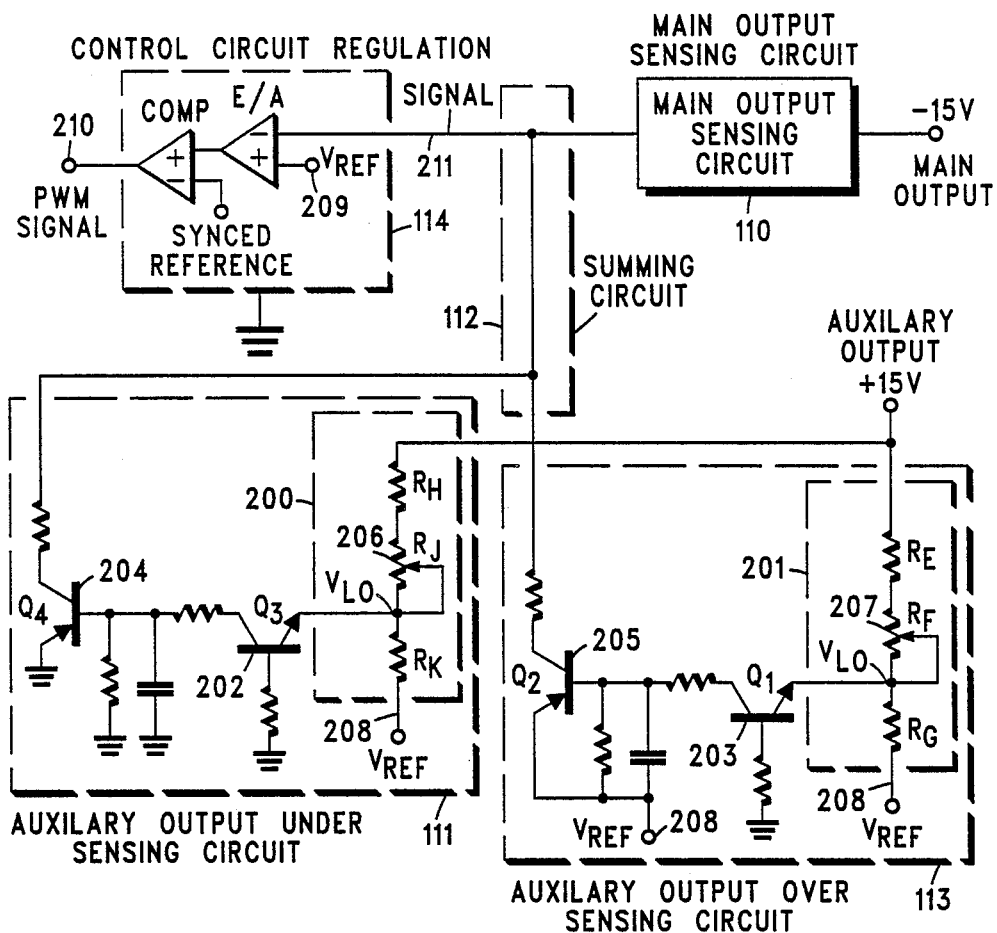
FIG. 2 illustrates one possible feedback circuit of the power supply of FIG. 1.

One possible feedback circuit (102) for a switch mode power supply having a main output of $-15\pm3\%$ Volts and one auxiliary output of $+15\pm5\%$ Volts is shown in FIG. 2. The feedback circuit (102), as mentioned above, comprises a main sensing circuit (110), a summing circuit (112), a control circuit (114), and auxiliary under and over sensing circuits (111 and 113). Both the auxiliary under and over sensing circuits (111 and 113) comprise a resistive divider (200 and 201), a first transistor, Q1 and Q3 (202 and 203), and a second transistor, Q2 and Q4 (204 and 205), respectively. The first predetermined threshold and the second predetermined threshold are established by the bias voltage of Q1 and Q2 (202 and 203), respectively. As shown if FIG. 2, the first predetermined threshold is approximately $-0.7$ V (Vthresh1=Vgrd$-$(Ib*Rb+Vbe), where Vgrd is 0.0 V), and the second predetermined threshold is approximately $+0.7$ V (Vthresh2=Ib*Rb+Vbe+Vgrd, where Vgrd is 0.0 V).

The resistive dividers (200 and 201) are connected to the auxiliary output (105) and Vref (208) to form the first and second representations of the auxiliary output (Vlo and Vhi), respectively. The resistive dividers (200 and 201) may also include a potentiometer Rj and Rf (206 and 207), such that the first and second predetermined values for the auxiliary output can be adjusted.

When the auxiliary output is above the first predetermined value and below the second predetermined value (Vlo is above the first predetermined threshold and Vhi is below the second predetermined threshold) both the auxiliary under and over sensing circuits (111 annd 113) are in high impedance state; Q2 (204) and Q4 (205) are off. With both of the auxiliary sensing circuits (111 and 113) off, the main sensing circuit (110) provides the regulation signal (211) to the control circuit (114). The control circuit (114), which may comprise a typical pulse width modulation (PWM) topology, compares the regulation signal (211) against a regulation voltage (Vreg) (209) to produce a PWM signal (210).

When the auxiliary output (105) reaches the first predetermined value (Vlo reaches the first predetermined threshold), the auxiliary output under sensing circuit (111) becomes active and contributes to the regulation signal (211). When Vlo is reached, Q3 (202) turns on, in a linear or switching mode state, to provide base current to Q4 (204) such that Q4 (204) turns on. With Q4 (204) on, in a linear or switch mode state, the auxiliary output under sensing circuit (111) provides at least part of the regulation signal (211). When the auxiliary output under sensing circuit (111) is providing part of the regulation signal (211), the main output (104) will be adjusted as well as the auxiliary output, but through proper design, the main output will remain within its predetermined limits.

Similarly, when the auxiliary output (105) reaches the second predetermined value (Vhi reaches the second predetermined threshold), the auxiliary output over sensing circuit (113) becomes active and contributes to the regulation signal (211). The operation of the auxiliary output over sensing circuit (113) is readily inferred from FIG. 2 and the above discussion of the auxiliary output under sensing circuit (111).

The circuit design of the feedback circuit (102) may be implemented in a variety of ways. For example, in the auxiliary output sensing circuits (111 and 113), Q1 (203) and Q3 (202) could be replaced with comparators such that the first and second predetermined threshold could be set at any practical value. Also, the summing circuit (112) could comprise buffers, A to D converters, an adder, and a D to A converter. However, if cost is a primary concern, the feedback circuit (102) of FIG. 2 is optimal.

What is claimed is:

1. In a power supplying device having a main output and at least one auxiliary output, wherein feedback regulates the main output and the auxiliary output is substantially dependent on the main output, a method for regulating the auxiliary output comprising the steps of:
   (a) adjusting the feedback to prevent the auxiliary output from substantially falling below a first predetermined value whenever the auxiliary output reaches the first predetermined value; and
   (b) adjusting the feedback to prevent the auxiliary output from substantially rising above a second predetermined value whenever the auxiliary output reaches the second predetermined value, wherein the second predetermined value is greater than the first predetermined value.

2. In a power supplying device having a main output and at least one auxiliary output, wherein feedback regulates the main output, and the auxiliary output is substantially dependant on the main output, the feedback comprises:
   regulation means for regulating the main output;
   main sensing means, operably associated with the regulation means and the main output, for sensing the main output and for providing a regulation signal to the regulation means such that the main output substantially maintains a predetermined value;
   auxiliary sensing means, operably associated with the regulation means and the auxiliary output, for sensing the auxiliary output and for providing an auxiliary regulation signal to the regulation means whenever the auxiliary output reaches a first predetermined value or reaches a second predetermined value, wherein the second predetermined vaslue is greater than the first predetermined value, such that the auxiliary output remains substantially above the first predetermined value and remains substantially below the second predetermined value.

3. In a switch mode power supply having a main output and at least one auxiliary output, wherein feedback substantially regulates the main output and the auxiliary output is dependant on the main output, a method for regulating the auxiliary output comprising the steps of:

(a) adjusting the feedback to prevent the auxiliary output from substantially falling below a first predetermined value whenever a first representation of the auxiliary output reaches a first predetermined threshold; and (b) adjusting the feedback to prevent the auxiliary output from substantially rising above a second predetermined value whenever a second representation of the auxiliary output reaches a second predetermined threshold, wherein the second predetermined value is greater than the first predetermined value.

4. In a switch mode power supply having a main output and at least one auxiliary output, wherein feedback substantially regulates the main output and the auxiliary output is dependant on the main output, the feedback comprises:

regulation means for regulating the main output;

main sensing means, operably associated with the regulation means and the main output, for sensing the main output and for providing a regulation signal to the regulation means such that the main output substantially maintains a predetermined value;

auxiliary sensing means, operably associated with the regulation means and the auxiliary output, for sensing the auxiliary output and for providing an auxiliary regulation signal to the regulation means whenever a first representation of the auxiliary output reaches a first predetermined threshold or whenever a second representation of the auxiliary output reaches a second predetermined threshold, such that the auxiliary output is substantially maintained between a first predetermined value and a second predetermined value wherein the second predetermined value is greater than the first predetermined value.

* * * * *